Figure 1:
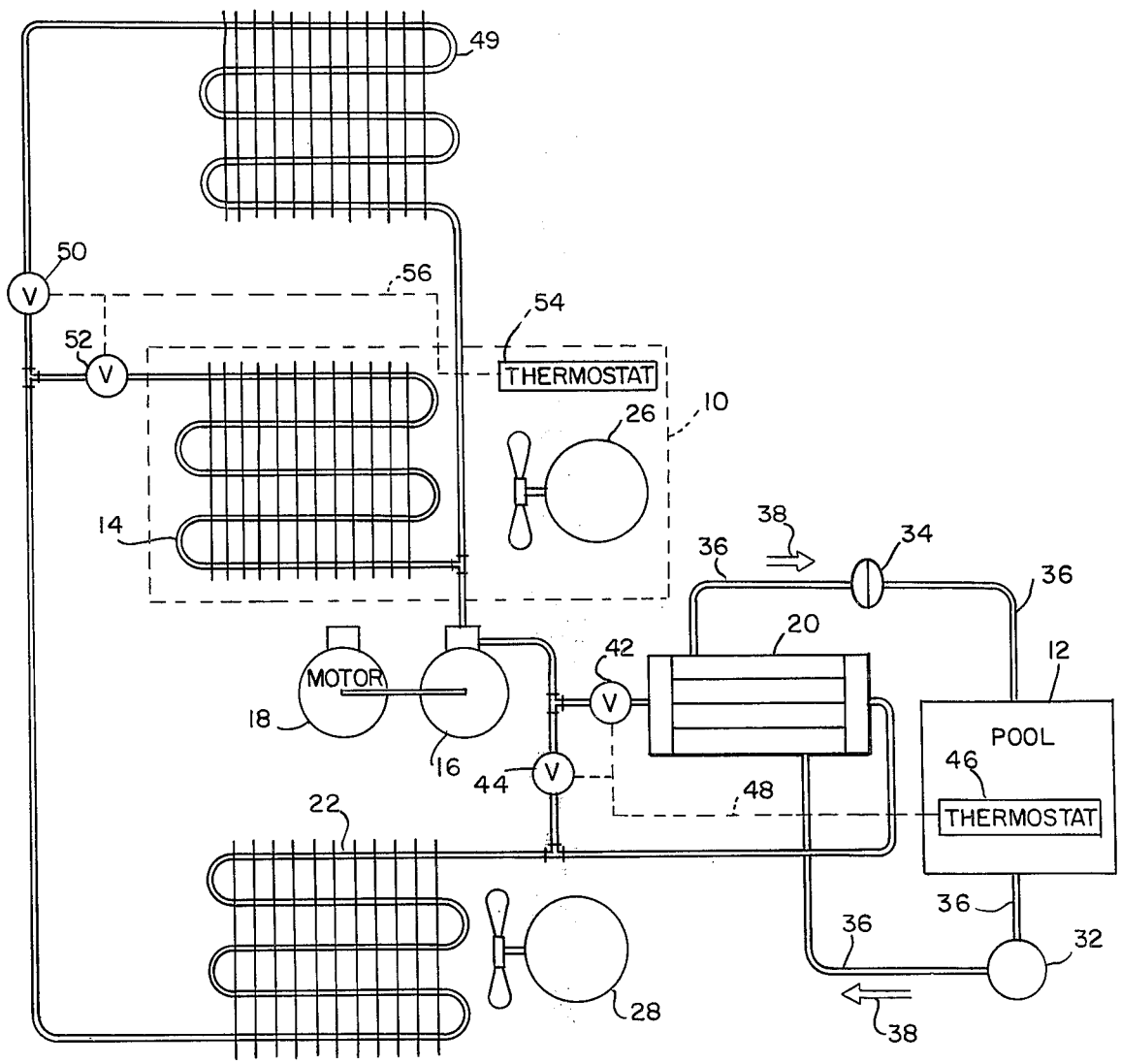

United States Patent [19]

Webber

[11] 3,926,008

[45] Dec. 16, 1975

[54] BUILDING COOLING AND POOL HEATING SYSTEM

[76] Inventor: Robert C. Webber, 8634 Brookville Road, Indianapolis, Ind. 46239

[22] Filed: Aug. 15, 1974

[21] Appl. No.: 497,765

[52] U.S. Cl. .................. 62/200; 62/238; 62/506; 4/172
[51] Int. Cl.² .................. E04H 3/18; F25B 39/02
[58] Field of Search ............ 62/238, 506, 223, 200; 237/28; 4/172

[56] References Cited
UNITED STATES PATENTS
3,498,072  3/1970  Stiefel .............................. 62/506 X Primary Examiner—William E. Wayner
Attorney, Agent, or Firm—William R. Coffey

[57] ABSTRACT

For use in cooling a building and warming a body of water, such as a swimming pool, a system comprising a compressor, a water-cooled condenser, an air-cooled condenser, an evaporator in cooling association with the interior of the building, an auxiliary evaporator external to the building, and refrigerant conduit means for connecting the said components in a conventional phase-change refrigeration circuit having a phase-change refrigerant therein. The water-cooled condenser is in heat-conducting association with the body of water. A pump may be used to pump the water through passageways in the water-cooled condenser. Thermostatically controlled valves are provided for connecting the compressor directly to the air-cooled condenser and by-passing the water-cooled condenser when the water body temperature increases to a predetermined level. Thermostatically controlled valves are also provided for by-passing the evaporator in the building and conducting the refrigerant through the auxiliary evaporator when the temperature in the building decreases to a predetermined level.

4 Claims, 2 Drawing Figures

BUILDING COOLING AND POOL HEATING SYSTEM

The present invention relates to refrigeration for air-conditioning systems, and more particularly to the provision of an improved system for cooling a building and, at the same time, warming a body of water such as a swimming pool adjacent the building.

The prior art is aware of instances where the heat emanating from a condenser means of a conventional phase-change refrigeration system is used to heat items that need to be heated. Reference is made to the following prior art patent references: The A. W. Ruff U.S. Pat. No. 2,696,085 issued Dec. 7,1954 in Class 62, subclass 4; the S. Andrassy U.S Pat. 3,022,781 issued Feb. 27, 1962 in class 126, subclass 271; the A. J. Ross U.S. Pat. No. 3,131,553 issued May 5, 1964 in Class 62, subclass 506; the J. P. Murdoch U.S. Pat. No. 3,320,762 issued May 23,1967 in Class 62, subclass 183; and the A. Whittell, Jr. U.S. Pat. No. 3,623,165 issued Nov. 30,1971 in Class 4, subclass 172.15.

The said Ruff U.S. Pat. No. 2,696,085 discloses the concept of immersing the condenser of a phase-change refrigeration system in a hot water storage tank to heat the water in the storage tank, the system being controlled thermostatically in accordance with the temperature of the water in the storage tank. I am not aware of any instance where anyone has attempted to heat a body of water, such as a swimming pool, with the condenser means of a system for air-conditioning a building. I have accomplished that objective with the invention disclosed herein by heating a swimming pool with the heat removed from the home adjacent the pool. The temperature of the pool water stays approximately 90°F. constantly. Also, I have lowered the cost of operating the air-conditioning unit for the home by a remarkable approximately 25% by making the condenser water-cooled instead of air-cooled. I leave the conventional air-cooled condenser in the refrigeration circuit, however, in case the pool water should exceed the desired temperature. I also place an auxiliary evaporator out in the yard and connect that in the refrigeration system to draw heat from the atmospheric air when the house is sufficiently cool and the water in the pool requires more heat. I use thermostatically-controlled valves dominated by a thermostat in the pool to switch between the water-cooled and air-cooled condenser and I use thermostatically- controlled valves dominated by a thermostat in the house to switch between the evaporator in the house and the evaporator in the yard.

It is a primary object of my present invention, therefore, to provide, for use in cooling a building and warming a body of water, a system comprising a compressor, condenser means, an evaporator in cooling association with the interior of the building, and refrigerant conduit means for connecting the compressor, condenser means and evaporator in a conventional phase-change refrigeration circuit having a phase-change refrigerant therein. The condenser means has a first passageway for conducting the refrigerant therethrough and a second passageway in heat-conducting association with the first passageway, the second passageway having an inlet end and an exhaust end. In the preferred system, a water pump is provided, and water conduit means is provided for connecting the body of water to the pump, the pump to the inlet end of the second passageway and the exhaust end of the second passageway to the body of water. Thus, water is pumped from the body of water through the water-cooled portion of the condenser means to absorb the heat from the refrigeration system and then back into the pool.

Another object of my present invention is to provide such an invention in which the condenser means includes, in series with the first passageway, an air-cooled condenser through which the refrigerant flows, and first thermostatically controlled valve means for connecting the compressor directly to the air-cooled condenser and by-passing the said first passageway when the temperature of the water body increases to a predetermined level.

Still another object of my present invention is to provide such a system including an auxiliary evaporator connected in the refrigeration circuit in parallel with the first-mentioned evaporator, the auxiliary evaporator being positioned externally to the building, and second thermostatically controlled valve means for by-passing the first-mentioned evaporator and conducting the refrigerant through the auxiliary evaporator when the temperature in the building decreases to a predetermined level.

Other objects and features of my present invention will become apparent as this description progresses.

To the accomplishment of the above and related objects, this invention may be embodied in the forms illustrated in the accompanying drawings, attention being called to the fact, however, that the drawings are illustrative only, and that changes may be made in the specific constructions illustrated and described, so long as the scope of the appended claims is not violated.

Figure 2:
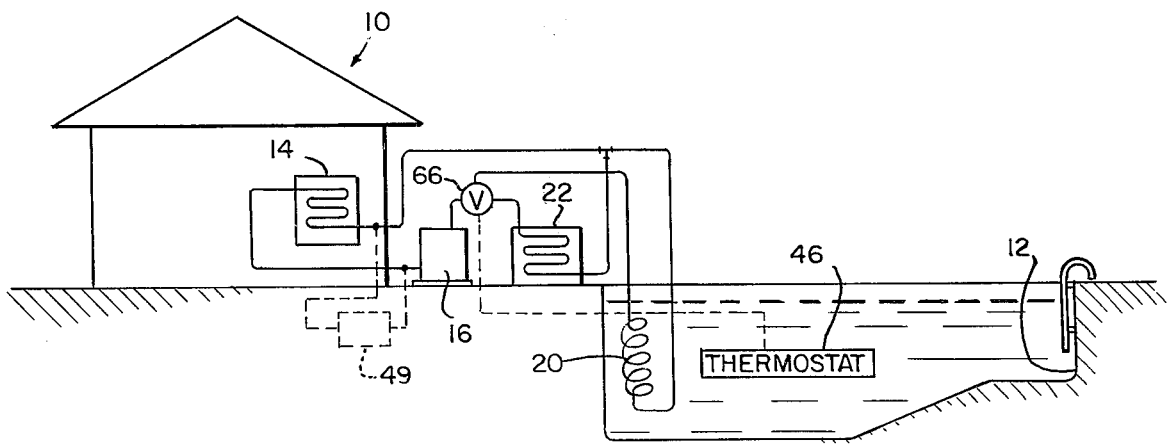

In the drawings:

FIG. 1 is a schematic diagram of a preferred embodiment of my present invention; and FIG. 2 is another schematic diagram of another embodiment of my present invention.

Referring now particularly to the drawings, it will be seen that I have illustrated a house 10 (shown in dashed lines in FIG. 1) and a pool 12. The air-conditioning system includes an evaporator 14 in cooling relationship with the interior of the house 10, a compressor 16 which is driven by a motor 18, a water-cooled condenser 20, an air-cooled condenser 22, a fan 26 for the evaporator 14 and a fan 28 for the air-cooled condenser 22. The manner in which a conventional phase-change refrigeration system operates is well known and need not be discussed in great detail herein.

I also show, in FIG. 1, a water pump 32, filter 34 and water pipes 36 connecting the pool to the pump, the pump to the water-cooled condenser 20, the condenser to the filter 34, and the filter 34 back to the pool. The arrows 38 show the direction of water flow from the pool through the condenser and back to the pool. The condenser 20 may conventionally be of the type having the first passageway for conducting the refrigerant therethrough and a second passageway in heat-conducting association with the first passageway for conducting the water from the pool therethrough.

I show a valve 42 connected between the compressor 16 and the condenser 20 and a by-pass valve 44 connected between the compressor 16 and condenser 22. These two valves are preferably thermostatically controlled valves which are operatively connected to a thermostat 46 in the pool, the operative connection being indicated at 48. When the temperature of the pool reaches a predetermined desired level, the thermostat 46 will provide an output effective to close the valve 42 and open the valve 44 to conduct refrigerant directly from the compressor 16 to and through the air-cooled condenser 22 and by-passing the water-cooled condenser 20. It will be appreciated that the air-cooled condenser 22 is always in the refrigeration circuit even when the refrigerant flows through the water-cooled condenser 20. In order to provide a heat source when the building is already cooled to a desired level, I provide another evaporator 49 connected in parallel with the first-mentioned evaporator 14 and disposed out in the yard. Then, I provide thermostatically-controlled valves 50, 52 which are dominated by a thermostat 54 disposed in the house and operatively connected to the valves 50, 52 as indicated at 56. When the house is cooled to a predetermined desired level, the thermostat 54 is effective to close the valve 52 and open the valve 50 so that the refrigerant will flow from the condenser 22 through the auxiliary evaporator 49.

Thus, in the system of FIG. 1, I can automatically by-pass the condenser 20 when the water in the pool 12 reaches a predetermined temperature level and I can by-pass the evaporator 14 in the house when the house reaches a predetermined temperature level.

Referring now to FIG. 2, it will be seen that the embodiment shown therein includes a 3-way valve 66 which is dominated by the thermostat 46 in the pool 12. In the embodiment of FIG. 2, the water-cooled condenser 20 is submerged in the pool. When the temperature of the water in the pool increases to a desired level, the valve 66 is operated to by-pass the condenser 20 and to conduct the refrigerant flow through the air-cooled condenser 22. In the embodiment of FIG. 2, if desired, an auxiliary evaporator 49 may be placed out in the yard to serve the same purpose discussed in conjunction with FIG. 1.

I claim:

1. For use in cooling a building and warming a swimming pool, a system comprising a compressor, condenser means, an evaporator in cooling association with the interior of said building, and refrigerant conduit means for connecting said compressor, condenser means and evaporator in a conventional phase-change refrigeration circuit having a phase-change refrigerant therein, said condenser means having a first passageway for conducting the refrigerant therethrough and a second passageway in heat-conducting association with said first passageway, said second passageway having an inlet end and an exhaust end, a water pump, and water conduit means for inter-connecting said swimming pool, said pump, the inlet end of said second passageway and the exhaust end of said second passageway such that water is pumped through said second passageway, an auxiliary evaporator connected in said refrigeration circuit in parallel with said first-mentioned evaporator, said auxiliary evaporator being positioned externally to said building, and second thermostatically controlled valve means for by-passing said first-mentioned evaporator and conducting the refrigerant through said auxiliary evaporator when the temperature in said building decreases to a predetermined level.

2. The invention of claim 1 in which said second valve means includes a valve between said condenser means and the first-mentioned evaporator and an alternate valve between said condenser means and said auxiliary evaporator, said valves being operatively connected such that opening of one valve closes the other valve.

3. For use in cooling a building and warming a swimming pool, a system comprising a compressor, condenser means, an evaporator in cooling association with the interior of said building, and refrigerant conduit means for connecting said compressor, condenser means and evaporator in a conventional phase-change refrigeration circuit having a phase-change refrigerant therein, said condenser means having a first passageway for conducting the refrigerant therethrough and a second passageway in heat-conducting association with said first passageway, said second passageway having an inlet end and an exhaust end, a water pump, and water conduit means for inter-connecting said swimming pool, said pump, the inlet end of said second passageway and the exhaust end of said second passageway such that water is pumped through said second passageway, said condenser means including, in series with said first passageway, an aircooled condenser through which said refrigerant flows, and first thermostatically-controlled valve means for connecting said compressor directly to said air-cooled condenser and bypassing said first passageway when the water temperature of said swimming pool increases to a predetermined level, an auxiliary evaporator connected in said refrigeration circuit in parallel with said first-mentioned evaporator, said auxiliary evaporator being positioned externally to said building, and second thermostatically-controlled valve means for by-passing said first-mentioned evaporator and conducting the refrigerant through said auxiliary evaporator when the temperature in said building decreases to a predetermined level.

4. For use in cooling a building and heating a swimming pool, a system comprising condenser means providing a refrigerant passageway in heat-conducting relation with the water in said pool, an evaporator in cooling association with the interior of said building, a compressor, and refrigerant conduit means for connecting said condenser means, evaporator, and compressor in a conventional phase-change refrigeration circuit having a phase-change refrigerant therein, said condenser means providing, in addition to and in series with said first-mentioned passageway, an air-cooled refrigerant passageway, first thermostatically controlled valve means for connecting said compressor directly to said air cooled passageway and by-passing said first-mentioned passageway in heat-conducting relation to the water when the temperature of the water in the pool increases to a predetermined level, an auxiliary evaporator connected in said refrigeration circuit in parallel with said first-mentioned evaporator, said auxiliary evaporator being positioned externally to said building, and second thermostatically-controlled valve means for by-passing said first-mentioned evaporator and conducting the refrigerant through said auxiliary evaporator when the temperature in said building decreases to a predetermined level.

* * * * *